US 6,736,909 B2

(12) United States Patent
Waki et al.

(10) Patent No.: US 6,736,909 B2
(45) Date of Patent: May 18, 2004

(54) BULK EXCHANGE-SPRING MAGNET, DEVICE USING THE SAME, AND METHOD OF PRODUCING THE SAME

(75) Inventors: Norihisa Waki, Kanagawa-ken (JP); Hideaki Ono, Kanagawa-ken (JP); Munekatsu Shimada, Tokyo (JP); Tatsuo Sugiyama, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 198 days.

(21) Appl. No.: 09/960,972

(22) Filed: Sep. 25, 2001

(65) Prior Publication Data

US 2002/0036559 A1 Mar. 28, 2002

(30) Foreign Application Priority Data

Sep. 26, 2000 (JP) ...................... P2000-291692

(51) Int. Cl.$^7$ ............................................... H01F 1/057
(52) U.S. Cl. ........................... 148/302; 75/233; 75/244
(58) Field of Search .............................. 148/300, 302; 75/228, 233, 244

(56) References Cited

U.S. PATENT DOCUMENTS

| | | | | |
|---|---|---|---|---|
| 6,332,933 | B1 * | 12/2001 | Ma et al. | 148/302 |
| 6,500,277 | B1 * | 12/2002 | Arai et al. | 148/302 |
| 2002/0017339 | A1 * | 2/2002 | Kanekiyo et al. | 148/302 |
| 2002/0112785 | A1 * | 8/2002 | Sekine et al. | 148/302 |
| 2002/0121315 | A1 * | 9/2002 | Nomura et al. | 148/302 |

FOREIGN PATENT DOCUMENTS

| | | |
|---|---|---|
| EP | 0286324 A1 | 10/1988 |
| JP | 10-092616 | 4/1998 |
| JP | 2000-208313 | 7/2000 |

OTHER PUBLICATIONS

Wang, Z. et al, "High–performance α–Fe/Pr$_2$Fe$_{14}$B–type nanocomposite magnets produced by hot compaction under high pressure", Journal of Applied Physics, American Institute of Physics, New York, US, vol. 88, No. 1, Jul. 1, 2000, pp. 591–593, XP001076984.

* cited by examiner

*Primary Examiner*—John Sheehan
(74) *Attorney, Agent, or Firm*—McDermott, Will & Emery (57) ABSTRACT

A bulk exchange-spring magnet 12, a method of producing the same, and a device 20 incorporating the bulk exchange-spring magnet are disclosed. The magnet includes magnet powders 10 having hard and soft phases, and boron and oxygen atoms which cohere in boundary areas 16 between grains 14 of the densified magnet powders 10. In a production method, the magnet powders 10 are compacted so as to incorporate boron and oxygen atoms into the boundary areas 16 and are heated under a compacted state of the magnet powders at varying operating temperatures for a given time period. This results in formation of a highly densified magnet at a lower potential operating temperature for a shorter time period without the grain growth. The device 20 includes the bulk exchange-spring magnet 12 containing the boron and oxygen atoms cohering between the grains of the densified magnet powders.

6 Claims, 6 Drawing Sheets

ENERGY PRODUCT LEVEL OF
CURRENT BONDED MAGNET

BULK EXCHANGE-SPRING MAGNET, DEVICE USING THE SAME, AND METHOD OF PRODUCING THE SAME

BACKGROUND OF THE INVENTION

This invention relates to magnet materials for a high performance magnet for use in an electrical motor, a magnet sensor, a rotational sensor, an acceleration sensor and the torque sensor, etc., and more particularly to a bulk exchange-spring magnet with improved magnetic properties, a device incorporating the same and a method of fabricating the bulk exchange-spring magnet.

Permanent magnets have elementary magnetic dipoles that are aligned in one direction and that are not altered with outer magnetic fields. Thus, the permanent magnets have a large intrinsic saturation magnetization and exhibit a rectangular demagnetization curve to serve as an excellent material.

As the permanent magnets, a chemically stable ferrite magnet with low cost or a high performance rare earth magnet have been put to practical use in recent years. Among these permanent magnets which have been in practical use, however, even a neodymium magnet with the maximum performance has a limit in its intrinsic magnetic properties wherein the limit remains in the maximum energy product of 50 MGOe (about 4.0 MJ/m$^3$).

The magnet has a structure that can be finely divided in a continuous step to finally result in atomic groups of Avogadro's numbers. In such a scale of an intermediate level between a micro-scale and a macro-scale such as an original magnet structure, atomics cooperate with each other to produce a specific function. This intermediate region is termed as a mesoscopic domain or nanoscale domain. An exchange-spring magnet has been developed on the basis of a property peculiar to such a domain and has a hard phase (a permanent magnet phase) composed of a material having a high coercivity, and a soft phase (a soft magnetic material) composed of a material having a high magnetic flux density, which are magnetically coupled to one another through an exchange interaction to provide a magnet with a high maximum energy product.

In general, the structure of the exchange-spring magnet is composed of a plurality of laminated thin films of a hard and soft phase or of the soft phase composed of fine grains dispersed in basic structures of the hard phase, and is termed as a nanocomposite structure. The presence of the laminated structure of the thin films or the dispersed structure of the fine grains in a macrostructure results in mere coexistence of the hard phase and the soft phase in the magnet structure with a demagnetization curve, which represents the magnet properties, tracing a snake profile. When, however, the nanoscale domain is composed of the laminated structure or the grain dispersed structure, the magnetization of the hard phase is strongly restricted with the magnetization of the soft phase such that the nanoscale domain entirely behaves as it were a single hard phase. That is, when the exchange-spring magnet, wherein magnetization is aligned in one direction, is applied with the demagnetizing field in a negative direction, a reversal in magnetization occurs from an intermediate portion of the soft phase, with the magnetization, in the vicinity of the magnetic domain wall between the hard phase and the soft phase, remaining in its aligned condition in a positive direction owing to a strong exchange-force. Under such a condition, if the demagnetizing field is released, the magnetization returns along the demagnetization curve. Since this action is resembled to a spring action, the magnet is termed an exchange-spring magnet. Also, the word "exchange" is employed as an initial because its theory is based on an mutual exchange interaction.

For example, it is considered below about a strong magnetic composite wherein an axis of easy magnetization is oriented in one direction and the hard and soft phases are alternately laminated. When magnetically saturating the composite in a positive direction and subsequently applying the demagnetizing field to the composite in a negative direction, the magnetization is first reversed at the center of the soft phase. At the boundaries between the hard and soft phases, the magnetization of the soft phase is hard to be reversed because the orientation of the magnetization at the soft phase is restricted by the orientation of the magnetization of the hard phase owing to the exchange interaction with magnetic moment at the hard phase. While the magnetic moment at the hard phase may be slightly varied in orientation of the magnetization at the boundaries between the hard phase and the soft phase, the presence of the smaller magnetic field in the magnetization of the hard phase than that of the boundaries wherein the magnetization is irreversibly reversed allow the applied magnetic field to be returned to a zero state such that the system is subjected to a spring back to its original state. If the hard phase is applied with a greater magnetization than the magnetic field that is irreversibly reversed, the magnetization of the entire system is also irreversibly reversed such that the system is saturated in the negative direction.

In general, what the maximum energy product of the magnet is limited depends on the magnetization of the compound which functions as a main phase. The nanocomposite magnet has shown to theoretically surpass the limit of the performance of the magnet, which has been currently in practical use, such that the nanocomposite magnet surpasses the theoretical value of the maximum energy product of 120 MGOe (about 9.6 MJ/m$^3$) of anistropic multi layers.

For all of these various reasons, the spotlight is focused on the exchange-spring magnet as a new magnetic material. The exchange-spring magnet has been usually developed mainly for the compound system composed of a hard phase containing a Nd—Fe—B system or a Sm—Fe—N system and a soft phase containing Fe—B or Fe—Co compounds. Japanese Patent Provisional Publication No. 2000-208313 discloses a technology for obtaining an anistropic exchange-spring magnet powders in finer grains with superior magnetic properties by repeatedly implementing an amorphous processing step and a crystalline processing step.

As discussed above, the exchange-spring magnet theoretically tends to have the extremely high maximum energy product, though implementation of a full dense treatment of the exchange-spring magnet powders causes the exchange-spring magnet powders to be coarse in grain size at such a high sintering temperature of 1000° C. required in the related art technologies, with resultant remarkably degraded magnetic properties (i.e., the maximum energy product). Therefore, it becomes difficult for the exchange-spring magnet powders to be densified in full dense state while maintaining the finer grain sizes of the magnet powders. Accordingly, in order to avoid the coarse grain growth, an extensive study has been conducted to apply the exchange-spring magnet powders to a so-called bonded magnet (in other word, a so-called plamag, plastic magnet or rubber magnet) wherein the magnet powders are mixed with plastic resin or rubber, followed by solidification of the magnet into a desired profile.

SUMMARY OF THE INVENTION

However, the density of the magnet powders contained in the bonded magnet remains at a remarkably lower value than the theoretical density of the magnet powders in the full dense magnet. This results in the formation of a final product with the maximum energy product which is far lower than that would be expected in the full dense magnet. That is, since the maximum energy product of the magnet decreases in proportion to the square of 2 of the charged density of the magnet, assuming that the charging rate is 50%, the energy product of the bonded magnet drops below 25% which is far lower than that of the bulk magnet.

The present invention has been made in view of the aforementioned circumstances and has an object of the present invention to provide an exchange-spring magnet having the density closest to the theoretical density of a full dense magnet powders shaped in a bulk without sacrificing the magnet properties.

It is another object of the present invention to provide a method of fabricating an exchange-spring magnet which has an improved magnet properties and which is enabled to be sintered at a lower temperature for a reduced time period than those of the related art technologies.

It is another object of the present invention to provide a device which employs an exchange-spring magnet with the aforementioned magnet properties, such as an electric motor, a magnet sensor, a rotational sensor, an acceleration sensor and a torque sensor.

According to a first aspect of the present invention, there is provided a bulk exchange-spring magnet which comprises a densified magnet powders including a hard phase and a soft phase, and boron atoms and oxygen atoms, wherein the boron atoms and the oxygen atoms cohere in boundary areas between grains of the densified magnet powders.

With such a structure, the presence of the cohering structure of the boron atoms and the oxygen atoms laying in the boundary areas between the grains of the magnet powders is effective for restricting the grain growth of the magnet powders. This results in a success of realizing superior magnet properties (i.e., maximum energy product) closest to that obtained in the theoretical density of the magnet powders of the full dense exchange-spring magnet.

According to a first aspect of the present invention, there is provided a bulk exchange-spring magnet which comprises means having grains formed of a hard magnetic phase and a soft magnetic phase mixed with one another, and means forming boundary areas between grains of the hard and soft magnetic phases to allow boron atoms and oxygen atoms to cohere therein.

According to a third aspect of the present invention, there is provided a method of producing a bulk exchange-spring magnet having densified magnet powders composed of a hard phase and a soft phase, and boron atoms and an oxygen atoms which cohere in boundary areas between grains of the densified magnet powders. The method comprises compacting magnet powders under a compacting pressure ranging from 300 to 1200 Mpa, heating the magnet powders under a compressed state at a starting temperature ranging from 25° C. to a holding temperature ranging from 550 to 800° C. at a temperature rising speed ranging from 5 to 40° C./min, and holding the compressed magnet powders at the holding temperature for a time period of 0.01 to 10 min for thereby densifying the magnet powders.

According to a fourth aspect of the present invention, there is provided a method of producing a bulk exchange-spring magnet having densified magnet powders composed of a hard phase and a soft phase, and boron atoms and an oxygen atoms which cohere in boundary areas between grains of the densified magnet powders. The method comprises compacting magnet powders under a pressure ranging from 500 to 1200 Mpa, heating the magnet powders under a compacted state at a starting temperature ranging from 25° C. to a holding temperature ranging from 650 to 700° C. at a temperature rising speed ranging from 10 to 25° C./min, and holding the compacted magnet powders at the holding temperature for a time period of 0.01 to 3 min for thereby densifying the magnet powders.

According to a fifth aspect of the present invention, there is provide a device equipped with a bulk exchange-spring magnet, wherein the bulk exchange-spring magnet comprises a densified magnet powders including a hard phase and a soft phase, and boron atoms and oxygen atoms, wherein the boron atoms and the oxygen atoms cohere in boundary areas between grains of the densified magnet powders.

BRIEF DESCRIPTION OF THE DRAWINGS

The invention, together with objects and advantages thereof, may best be understood by reference to the following description of the presently preferred embodiments together with the accompanying drawings, in which.

DETAILED DESCRIPTION OF THE PREFERRED EMBODIMENTS

Figure 1:
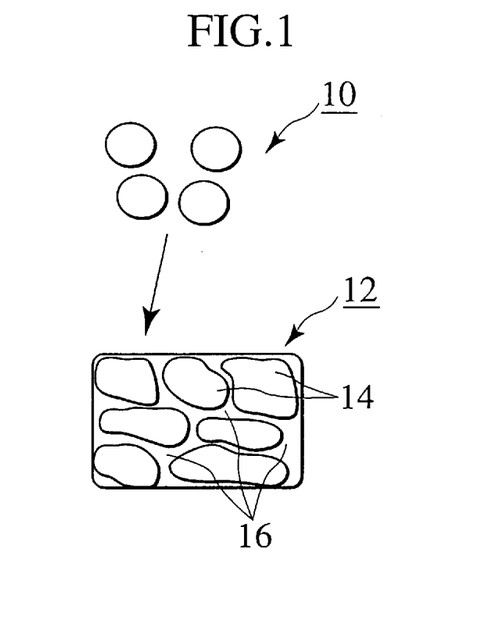
FIG. 1 is a schematic view of a bulk exchange-spring magnet of a preferred embodiment according to the present invention.

Referring to FIG. 1, there is shown a bulk exchange-spring magnet 12 of a preferred embodiment according to the present invention. The bulk exchange-spring magnet 12 is composed of densified magnet powders 10 including a hard phase and a soft phase, and boron atoms and oxygen atoms which cohere in boundary areas 16 between grains 14 of the magnet powders 10.

The magnet powders 10 may preferably be constructed of magnetic materials containing desired constituent elements formed in nearly close to an amorphous state, using various forming method such as a rapid quenching process, a mechanical alloying process and an atomizing process as well as a mechanical pulverizing process using a crusher or a mill, etc. Among these forming processes, the rapid quenching process is preferably one of a typical excellent forming technology with its ability to provide an adequate performance in the formation of the magnet powders in the amorphous state.

In accordance with the present invention, the word "densification" is meant by improving a density of the magnet powders by implementing a compacting or sintering step, and the word "cohering" is meant by a state wherein given constituent elements are partial to and cohere in the boundary areas 16 between the grains 14 of the magnet powders 10 with a greater concentrating distribution pattern than those inside the grains 14 of the magnet powders 10.

A preferred densification technology is performed by adopting a process wherein the magnet powders, which are nearly formed in the amorphous state, are charged in a mold and is then heated for a given time interval under a compressed state to complete a sintering step. In such a densification step, the boron atoms and the oxygen atoms cohere at the grain boundaries of the magnet powders to form a bulk exchange-spring magnet, which has the hard and soft phase in the form of fine crystal grains with a density closest to a theoretical density of a full dense bulk exchange-spring magnet, without a significant loss in the magnet properties. That is, the presence of the nanocrystalline and nonocomposite structure in the bulk magnet, wherein the boron atoms and the oxygen atoms cohere in the boundary areas 16 between the grains 14 of the magnet powders 10 in accordance with the present invention, facilitates the magnet powders 10 to be effectively densified while restricting the grain growth of the magnet powders. For this reason, it is possible for the magnet powders 10 to be sintered at a lower temperature than the magnet forming process of the related art for a shorter time period than the same, with a resultant restriction in the formation of coarse crystalline structure that would otherwise cause a serious matter to be solved in the related art. As a result, with such a structure of the bulk exchange-spring magnet according to the present invention, it is possible for the bulk exchange-spring magnet to be realized with good intrinsic magnet properties nearly equal to that of the full dense bulk exchange-spring magnet having a theoretical density.

Specifically, the bulk structure, wherein not only the boron atoms but also the oxygen atoms are concurrently present in the boundary areas 16 between the grains 14 of the magnet powders 10, allows the grain growth of the magnet powders 10 to be remarkably restricted at a higher efficiency than that of a bulk structure wherein only the boron atoms are present in the boundary areas between the grains of the magnet powders. This may result from a thermal stability of a B—O compound. Further, another advantage is found in such a bulk structure of the present invention in that the bulk structure 12 has an increased mechanical strength.

Although, as a supply source of oxygen to be supplied to the boundary areas 16 between the grains 14 of the magnet powders 10, although it may be possible to utilize oxygen preliminarily present in the magnet powders 10, a high oxygen content environment for which handling of the magnet powders is implemented and an oxygen environment for which the densification step is carried out, the present invention is not limited thereto. Since, however, the presence of only oxygen atoms present in the boundary areas 16 between the grains 14 of the magnet powders 10 composed of rare earth magnetic materials generally causes degradation in the magnetic properties, it is undesirable to introduce only the oxygen atoms into the boundary areas between the grains 14 of the magnet powders 10 by an amount beyond an excessive level. Also, the boron atoms may be preliminarily incorporated in the magnet powders in suitable expedients.

As previously noted, the hard phase is composed of a permanent magnetic phase composed of various known magnetic materials having a high coercivity. In particular, the hard magnetic phase is composed of yttrium containing rare earth elements (i.e., lanthanum, cerium, praseodymium, samarium, europium, gadolinium, terbium, dysprosium, holmium, erbium, thulium, ytterbium, lutetium), iron and/or cobalt, and boron containing elements.

As noted above, the soft phase is composed of a soft magnetic phase composed of various known materials having a high magnetic flux density. In particular, the soft magnetic phase is constructed of the iron and/or cobalt phase and is, more specifically, constructed of an $\alpha$-Fe phase, and an $\alpha$-Fe phase wherein a part thereof is substituted with rare earth elements involving cobalt, boron and yttrium to provide a Fe—B compound, Fe—Co compound, etc.

Theoretically, although it is possible for a hard and soft phase combination to be arbitrarily selected, it is desired for the hard and soft phase combination to be selected such that both the hard and soft phases have a high degree of saturation magnetization. Further, there exists a case by chance wherein the exchange-spring magnet includes a $Fe_3Zr$ phase, as a crystalline phase, except for the hard and soft phase.

There exists no limitation in a composition of the magnetic materials provided that the composition realizes a magnetic structure wherein the hard and soft phases are concurrently present and the boron atoms and the oxygen atoms cohere in the boundary areas between the grains of the magnet powders. In a case where the composition of the magnetic materials is composed of 4 to 11 atom % of Nd, 3 to 8 atom % of B and remaining part composed of transition metals and in a more particular case where a composition formula of the magnetic materials is expressed as $Nd_xFe_{100-x-y}B_y$ wherein $x=4\sim11$ and $y=3\sim8$, it is possible to realize a high performance magnet with a desired proportional balance of the hard and soft phase that provides a high coercivity and a high magnetic flux density. It is more preferable with a view to having a further improved magnet performance that the composition of the magnetic materials is composed of 7.5 to 10.5 atom % of Nd and 5.5 to 7.5 atom % of B and that the composition formula of the magnetic materials is expressed as $Nd_xFe_{100-x-y}B_y$ wherein $x=7.5\sim10.5$ and $y=35.5\sim7.5$. Also, the metallic material Nd may be partly substituted with Pr and/or Dy, with the transition metal being mainly composed of Fe atoms that may be partly substituted with Co. Further, in order to promote the coherence of the boron atoms and the oxygen atoms in the boundary areas 16 between the grains 14 of the magnet powders 10 to provide increased intrinsic magnetic properties, it is preferable to add a small amount of elements such as transition metals. Optimum constituent elements to be preferably added contain 0.4 to 5.0 atom % of more than one metals selected from a group consisting of V, Nb, Cr, Cu, Zn and Ti. Also, the concentration of the added constituent elements is analyzed with an Inductively Coupled Plasma/Optical Emission Spectrometry (ICP/OES).

The bulk exchange-spring magnet of the present invention features the presence of the boron atoms and the oxygen atoms lying between the finer grains of the bulk exchange-spring magnet. A difference between the concentration of the boron atoms and the oxygen atoms present inside the grains of the bulk exchange-spring magnet and that of the boron atoms and the oxygen atoms present in the cohered region between the grains brings about a strong influence on the intrinsic magnetic properties. Various test results has revealed that the ratio between the concentration of the boron atoms present in the boundary areas 16 between the grains 14 of the densified magnet powders 10 and that of the boron atoms present inside the grains 14 of the magnet powders 10, (i.e., the concentration of the boron atoms present in the boundary areas 16 between the grains 14 and the concentration of the boron atoms present inside the grains 14), is preferably selected to be greater than 1.2, and the ratio between the concentration of the oxygen atoms present in the boundary areas 16 between the grains 14 of the densified magnet powders 10 and that of the oxygen atoms present inside the grains 14 of the densified magnet powders 10, (i.e., the concentration of the oxygen atoms present in the boundary areas 16 between the grains 14 versus the concentration of the oxygen atoms present inside the grains 14), is preferably selected to be greater than 1.2. With such a concentration ratio, a good thermal stability of the compound between the grains 14 is maintained, with a resultant improvement in the densification of a bulk body. In addition, crystalline growth between the grains of the magnet materials is effectively restricted in a reliable manner.

Further, a thickness of each boundary area 16 in which the boron atoms and the oxygen atoms cohere plays an important roll for the improvement of the intrinsic magnetic properties and is consequently adjusted to a value beyond 65 nm in size. With such an adjustment in thickness of the boundary area for the introduction of the boron atoms and the oxygen atoms, the densification of the magnet powders 10 is effectively promoted to obtain an increased density of the bulk magnet 12 after sintering step, thereby enabling a high performance magnet to be produced.

The grain size of the magnet powders is preferably selected to have a desired grain distribution pattern to allow the magnet powders to be easily densified. To this end, the magnet powders 10 should preferably have a grain size ranging between 20~500 μm. With selection of the magnet powders 10 in such a grain size, it is effective to restrict an increase in surface areas of the magnet powders 10 to prevent the magnet powders 10 from oxidation for thereby improving the intrinsic magnet properties while enabling the charging rate of the materials to be increased to realize the bulk magnet 12 with an increased density. In order to have the magnet powders 10 to be further densified, it is more preferable to employ the magnet powders 10 of a grain size ranging between 80~200 μm. It is to be noted here that the word "grain size of the magnet powders" is meant by an average value of measured results in diameters of respective grains each having the maximum length, of grains of which photograph are taken with an optical microscope and which are observed in a photograph.

According to a second aspect of the present invention, the is provide a method of producing a bulk exchange-spring magnet which is composed of a densified magnet powders containing a hard and soft phase with a structure which includes boron atoms and oxygen atoms which cohere in the boundary areas 16 between the grains 14 of the magnet powders 10. This production method is performed by compacting raw magnet powders 10 under a compacting pressure of 300~1200 Mpa to produce a compacted body, heating the compacted body from a starting temperature as high as 25° C. to a holding temperature as high as 550~800° C. at a temperature raising speed of 5~40° C. while maintaining the compacted body under the compacting pressure, keeping the compacted body at the holding temperature for a time period of 0.01~10 min, and finally sintering the compacted body of the magnet powders.

While the temperature, at which the compressing step for the raw magnet powders 10 is implemented, is not limited to a specific potential value, it is preferred for the compacting step to be carried out at an ambient temperature around a working environment with the aim of providing an ease of handling at low cost. Further, as the working environment, it is highly preferable for the environment to be considered about various parameters such as the humidity with a view to avoiding a degradation in the magnetic properties of the bulk magnet 12 caused by oxidation of the raw magnet powders 10.

As a densification process of the bulk exchange-spring magnet 12 embodying the present invention, it is highly advisable to heat the magnet powders 10, which has been charged into a mold, under a compacted state. To realize this step, it is possible to employ a hot pressing technique or a plasma discharge sintering technique. Particularly, the discharge plasma sintering method is preferred because of an ease of control in raising temperatures to realize a precise temperature profile. Further, there exists no limitation in materials of the mold and any material may be suitably used as the materials of the mold. As a process condition for heat treatment of the magnet powders to be carried out under the compression step, the compression pressure should be preferably maintained at the pressure greater than 300 Mpa in order to promote the densification of the magnet powders to improve the magnet performance while enabling the magnet powders to be densified with the theoretical density of greater than 95%. The larger the compacting force for the magnet powders, the higher will be the promotion in the densification of the magnet powders, though the compression pressure is suitably selected to be less than 1200 Mpa for the sake of improved productivity.

Further, the temperature raising speed is suitably set within a range of 5~40° C./min. With such a range, it is possible to increase the cohering portions of the boron atoms and the oxygen atoms lying in the boundary areas 16 between the grains 14 of the magnet 12, with a resultant improvement in the densification of the magnet 12. In addition, it is possible for the bulk magnet 12 to internally have a uniform temperature distribution pattern during sintering operation, thereby obtaining a uniform bulk body.

Further still, the presence of the holding temperature and the holding time period selected to respective suitable ranges allows the bulk magnet to have the excellent magnetic properties. As a result of a detailed study for these conditions, the holding temperature is suitably set to a value as high as 550~800° C., and the holding time period is suitably set to a value ranging from 0.01 to 10 min. With such ranges, the grain growth in the hard phase and the soft phase is desirably restricted, thereby improving the magnet properties while improving the density of a sintered magnetic product.

Also, in order to further improve the magnet properties, the magnet powders should preferably treated in various steps under various conditions: in that the compacting pressure is selected to remain in a range as high as 500~1200 MPa, in that the temperature raising speed is selected to a value ranging from 10~25° C./min, in that the holding temperature is maintained at a value as high as 650~700° C. and in that the holding time is maintained at a value less than 3 min.

When utilizing a rapid quenching process for a molten alloy in the form of liquid as a fabrication process for the magnet powders, a peripheral speed of a rapidly rotating roll brings about a significant influence on the quality of the magnet powders during a quenching step. In such a process, a stream of molten alloy is directed onto the outer surface of the roll, which rotates at the peripheral speed as high as 10~50 m/sec, to produce a rapidly quenched thin strip for ensuring a large concentration of amorphous state and for increasing productivity. Furthermore, the presence of fine crystalline grains mixed in the amorphous state is remarkably effective for improving the magnet properties. To this end, the peripheral speed of the roll is more preferably set to a value as high as 15~35 m/sec.

Of the above various parameters, during the sintering step, the magnet powders are preferably maintained under the compacted condition at the compacting pressure of $1\times10^{-4}$~9.5 Pa and, more preferably, in a range of $2\times10^{-4}$~3 Pa. Compacting the magnet powders in such a range renders an improved densification of the magnet powders to be carried out without a degradation in the magnet properties. That is, a desired amount of oxygen is supplied to between the grains of the magnet powders to promote the densification of the bulk body and to restrict the grain growth of the crystalline at the boundaries of the magnet powders. Also, the presence of the oxygen supplied only to the boundary areas between the grains of the magnet powders avoids the oxygen atoms from diffusing inside the grains of the magnet powders for thereby preventing the magnet powders from oxidization with improved magnet properties.

Although there exists various suitable conditions discussed above, the presence of the cohering portions of the boron atoms and oxygen atoms lying between the grains of the magnet powders enables fabrication of the bulk magnet at a lower potential operating temperature than that of the sintering process of the related art for a shorter time period than that of the same, allowing the bulk exchange-spring magnet, which has the density in close proximity to the theoretical density of the full dense magnet powder, to be fabricated without degradation in the magnet properties of the bulk exchange-spring magnet.

According to a third aspect of the present invention, there is provided a device such as an electric motor, a magnet sensor, a rotational sensor, an acceleration sensor or a torque sensor, which employs a bulk exchange-spring magnet of a structure composed of densified magnet powders including a hard phase and a soft phase, and boron atoms and oxygen atoms cohering in the boundary areas between the grains of the densified magnet powders. With the bulk exchange-spring magnet according to the present invention, it is possible to realize a high performance magnet that could not be obtained in the related art exchange-spring magnet serving as a bonded magnet. In the event that such an excellent performance magnet 12 is applied to the electric motor, the magnet sensor, the rotational sensor, the accelerator sensor or the torque sensor, it becomes possible for promoting miniaturization and weight reduction of products and when these products are employed as component parts of an automotive vehicle, a remarkable reduction in fuel consumption can be reliably achieved.

The thickness of the bulk exchange-spring magnet according to the present invention is not limited to a specific value discussed above and may be suitably adjusted in dependence on various applications. Further, the shape of the bulk magnet may be suitably adjusted to meet the various applications and is not limited to a particular shape.

On one hand, since the rare earth magnet is apt to be oxidized, a protective film may be applied to the surface of the bulk exchange-spring. The protective film is not limited to a particular structure and may have suitable compositions depending on the magnet properties such that the thickness is determined to obtain an adequate protecting effect. As definite examples, the protecting film may include a metallic film, an inorganic compound film or an organic compound film. The metallic film may include Ti, Ta, Ca, Mo or Ni. The inorganic compound film may include a transition metal nitride such as TiN, FeN or CrN, or a transition metal oxide film such as NiO or FeO. The organic compound film may include a synthetic resin film such as epoxy resin, phenol resin, polyurethane or polyester. When using the protective film composed of the metallic film or the inorganic compound film, the protective film may preferably have a thickness of about 0.01 to 10 $\mu$m and when the protective film is composed of the organic compound film, the protective film may preferably have a thickness of about 3 to 10 $\mu$m.

The bulk exchange-spring magnet may be processed, using various technologies in the related art. That is, the processing of the bulk magnet can be implemented by grinding (such as an external surface grinding, an internal surface grinding, a surface grinding or shaped mold grinding etc.), cutting (such as an outer periphery cutting or internal periphery cutting etc.), rapping or chamfering etc. A processing tool may include a diamond tool, a GC grinder, an inner and outer periphery cutting machine, an inner and outer periphery grinding machine, a surface grinding machine, An NC machine tool, a milling machine or a machining center.

EXAMPLE 1

Figure 2:
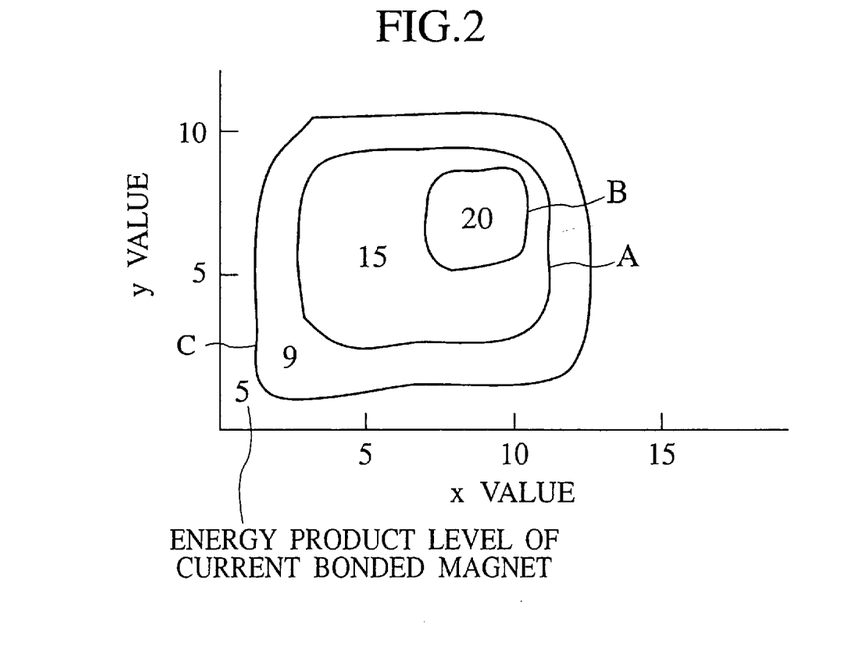
FIG. 2 is a graph illustrating a relative value of magnet properties of a bulk magnet, in terms of variations in x and y values, with $Nd_xFe_{100-x-y}B_y$ composition.

FIG. 2 is a graph illustrating a relative value of magnet properties (Maximum Energy Product) in terms of variations in x-axis and y-axis of a bulk magnet with a $Nd_xFe_{100-x-y}B_y$ composition obtained in a fabricating condition listed below.

Composition: $Nd_xFe_{100-x-y}B_y$

Fabricating condition of magnet powders: rapid liquid quenching process with a peripheral speed of a roll=20 m/sec Grain size of magnet powders: 100 $\mu$m Sintering condition: compacting pressure=800 MPa, temperature rising speed at 20° C./min, holding temperature at 675° C. for a holding time period of 5 min, and a surrounding pressure during quenching process at $2.6\times10^{-4}$ Pa.

As seen from FIG. 2, with x=4~11, and y=3~8, the maximum energy product of the magnet is improved and in the case of x=7.5~10.5, and y=5.5~7.5, it exhibits that a remarkable effect is obtained. It was also confirmed that in cases where a part is substituted with Pr or Dr, where a part of Fe is substituted with Co, and where as a part of Fe or Co, the magnet powders are added with a small amount of about 0.4~5.0 atom % of more than one element (selected from a group consisting of V, Nb, Cr, Cu, Zn and Ti), improved magnetic properties are improved in a similar composition range.

EXAMPLE 2

Figure 3:
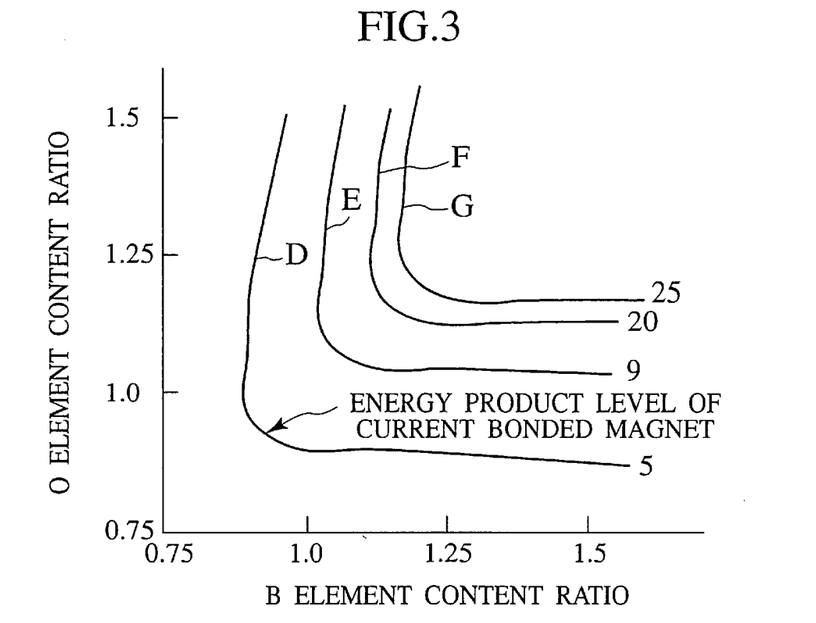
FIG. 3 is a graph illustrating the magnet properties of bulk magnets with $Nd_xFe_{100-x-y}B_y$ composition wherein x=4~11 and y=3~8, in terms of concentration ratio of boron atoms and oxygen atoms lying between the grains of the magnet powders and those contained in the grains of the magnet powders.

FIG. 3 is a graph illustrating the relationship between the magnet properties and variations in boron concentration and oxygen concentration between grains of a bulk magnet fabricated with a $Nd_xFe_{100-x-y}B_y$ composition, wherein x=4~11, and y=3~8 in various fabricating conditions, in comparison with those inside the magnet powders. As seen from FIG. 3, with a case where the concentration ratio between the boron atoms and the oxygen atoms is greater than 1.2, it is recognized that the magnet properties (the maximum energy product) are improved.

EXAMPLE 3

Figure 4:
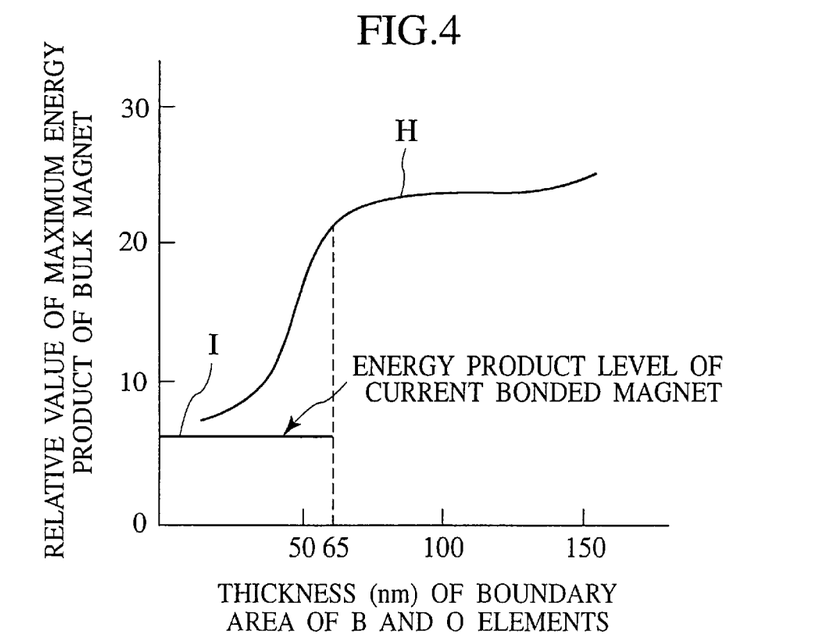
FIG. 4 is a graph illustrating the magnet properties of a bulk magnet with $Nd_xFe_{100-x-y}B_y$ composition wherein x=4~11 and y=3~8, in terms of a thickness of a cohering portion of the boron atoms and the oxygen atoms lying between the grains of the magnet powders.

FIG. 4 is a graph illustrating a curve of the magnet properties of a bulk magnet fabricated with a $Nd_xFe_{100-x-y}B_y$ composition, wherein x=4~11, and y=3~8 in various fabricating conditions, plotted in terms of the thickness of the cohering portion of the boron atoms and the oxygen atoms lying between the grains of the magnet powders. As seen from FIG. 4, with a case where the cohering portion of the boron atoms and the oxygen atoms has a thickness greater than 65 nm, it is recognized that the magnet properties (the maximum energy product) are improved.

EXAMPLE 4

Figure 5:
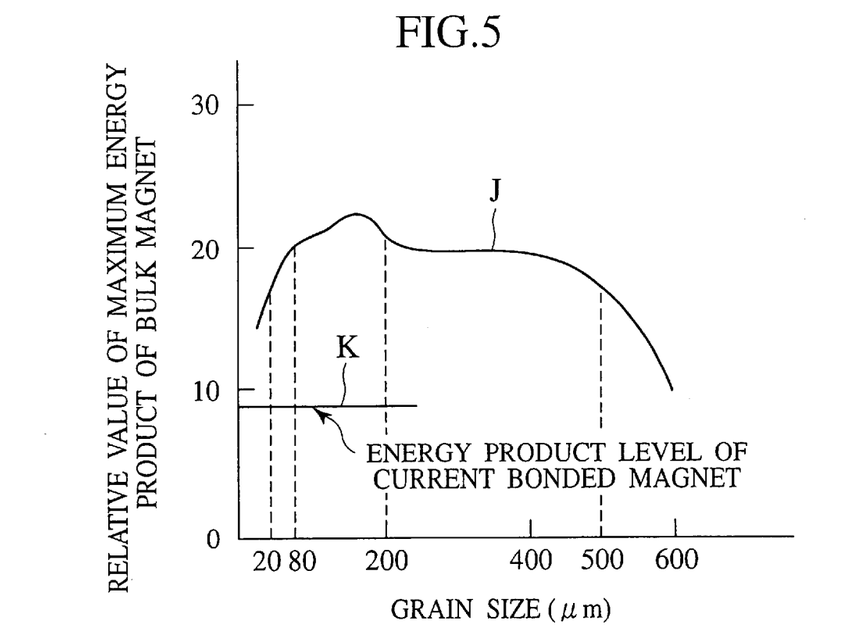
FIG. 5 is a graph illustrating the magnet properties of a bulk magnet with $Nd_9Dy_1Fe_{77}Co_5Nb_2B_6$ composition in terms of grain sizes of the magnet powders.

FIG. 5 is a graph illustrating a curve of the magnet properties (maximum energy product) of a bulk magnet fabricated with a $Nd_9Dy_1Fe_{77}Co_5Nb_2B_6$ composition, plotted in terms of the grain size of the magnet powders, with the bulk magnet was prepared under the following fabricating condition:

Composition: $Nd_9Dy_1Fe_{77}Co_5Nb_2B_6$

Fabricating condition of magnet powders: rapid liquid quenching process with a peripheral speed of a roll=30 m/sec Sintering condition: compacting pressure=1000 MPa, temperature rising speed at 24° C./min, holding temperature at 650° C. for a holding time period of 3 min, and a surrounding pressure at $2.6\times10^{-4}$ Pa.

As seen from FIG. 5, with a case where the grain size of the magnet powders remain in a range from 20 to 500 μm, it is recognized that the magnet properties are improved and when the grain size is in a range from 80 to 200 μm, further improved magnet properties are obtained.

EXAMPLE 5

Figure 6:
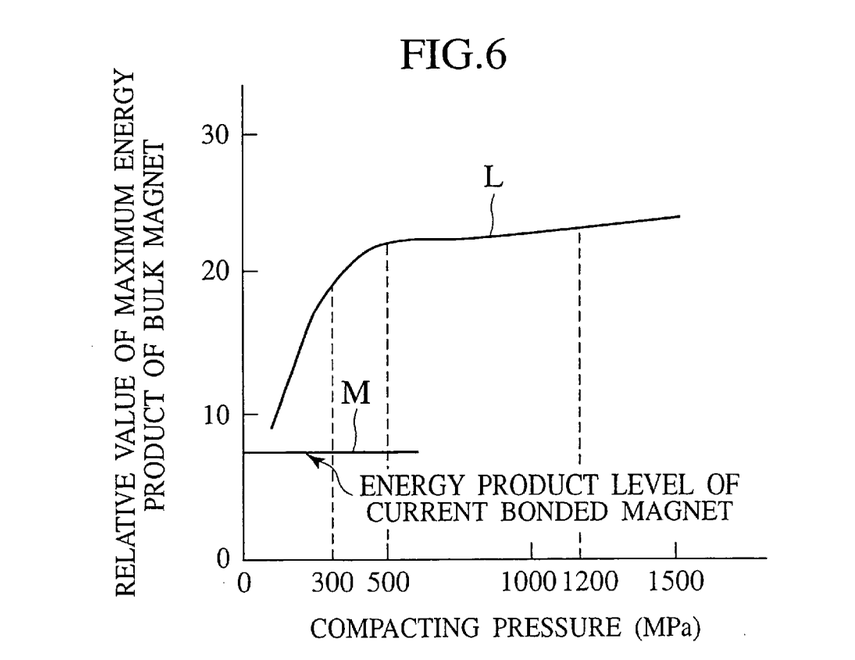
FIG. 6 is a graph illustrating the magnet properties of a bulk magnet with $Nd_7Dy_1Fe_{74}Co_5Cr_5B_8$ composition in terms of a compressing pressure applied during a sintering step.

FIG. 6 is a graph illustrating a curve of the magnet properties (maximum energy product) of a bulk magnet fabricated with a $Nd_7Dy_1Fe_{74}Co_5Cr_5B_8$ composition, plotted in terms of the compressing pressure, with the bulk magnet was prepared under the following fabricating condition:

Composition: $Nd_7Dy_1Fe_{74}Co_5Cr_5B_8$

Fabricating condition of magnet powders: rapid liquid quenching process with a peripheral speed of a roll=15 m/sec Sintering condition: compacting pressure=1000 MPa, temperature rising speed at 30° C./min, holding temperature at 675° C. for a holding time period of 5 min, and a surrounding pressure at $2.6\times10^{-4}$ Pa.

As seen from FIG. 6, with a case where the compacting pressure remain in a range from 300 to 1200 MPa, it is recognized that the magnet properties are improved and when the compacting pressure is in a range from 500 to 1200 MPa, further improved magnet properties are obtained.

EXAMPLE 6

Figure 7:
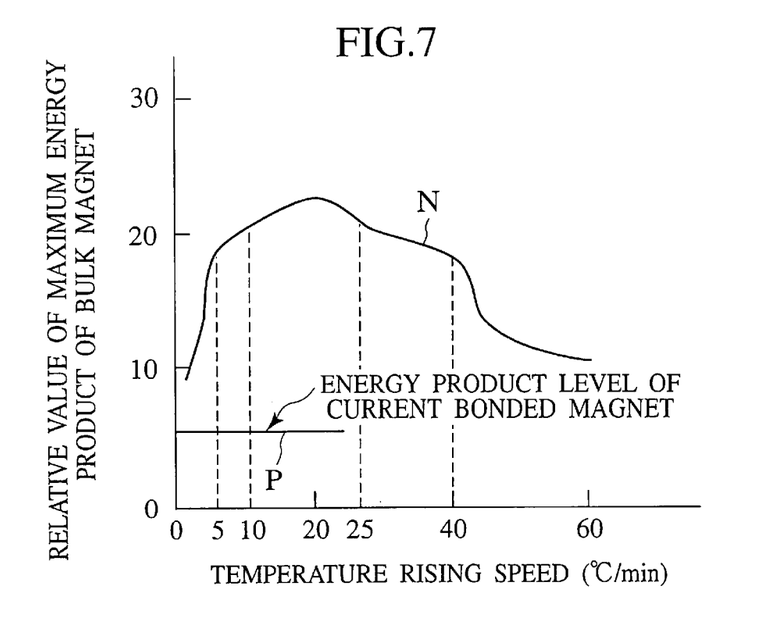
FIG. 7 is a graph illustrating the magnet properties of a bulk magnet with $Nd_4Tb_1Fe_{81}Co_7Cu_3B_4$ composition in terms of a variation in a temperature rising speed.

FIG. 7 is a graph illustrating a curve of the magnet properties (maximum energy product) of a bulk magnet fabricated with a $Nd_4Tb_1Fe_{81}Co_7Cu_3B_4$ composition, plotted in terms of the temperature rising speed, with the bulk magnet was prepared under the following fabricating condition:

Composition: $Nd_4Tb_1Fe_{81}Co_7Cu_3B_4$

Fabricating condition of magnet powders: rapid liquid quenching process with a peripheral speed of a roll=50 m/sec Sintering condition: compacting pressure=500 MPa, holding temperature at 640° C., a holding time period of 8 min, and a surrounding pressure at $2.6\times10^{-4}$ Pa.

As seen from FIG. 7, with a case where the temperature rising speed remain in a range from 5 to 40° C., it is recognized that the magnet properties are improved and when the temperature rising speed is in a range from 10 to 25° C./min, further improved magnet properties are obtained.

EXAMPLE 7

Figure 8:
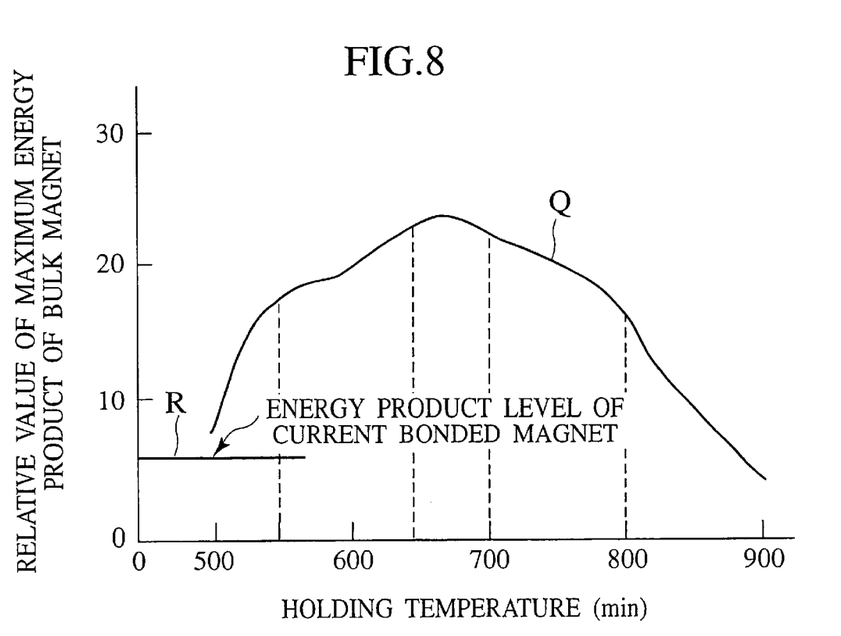
FIG. 8 is a graph illustrating the magnet properties of a bulk magnet with $Nd_{10}Fe_{76}Co_8V_1B_6$ composition in terms of a variation in a holding temperature during a sintering step.

FIG. 8 is a graph illustrating a curve of the magnet properties (maximum energy product) of a bulk magnet fabricated with a $Nd_{10}Fe_{75}Co_8V_1B_6$ composition, plotted in terms of the holding temperature, with the bulk magnet was prepared under the following fabricating condition:

Composition: $Nd_{10}Fe_{75}Co_8V_1B_6$

Fabricating condition of magnet powders: rapid liquid quenching process with a peripheral speed of a roll=15 m/sec Sintering condition: compacting pressure=1000 MPa, temperature rising speed of 22° C./min, a holding time period of 0 min, and a surrounding pressure at $2.6\times10^{-4}$ Pa.

As seen from FIG. 8, with a case where the holding temperature remains in a range from 550 to 800° C., it is recognized that the magnet properties are improved and more preferably at the holding temperature in a range from 650 to 700° C., further improved magnet properties are obtained.

EXAMPLE 8

Figure 9:
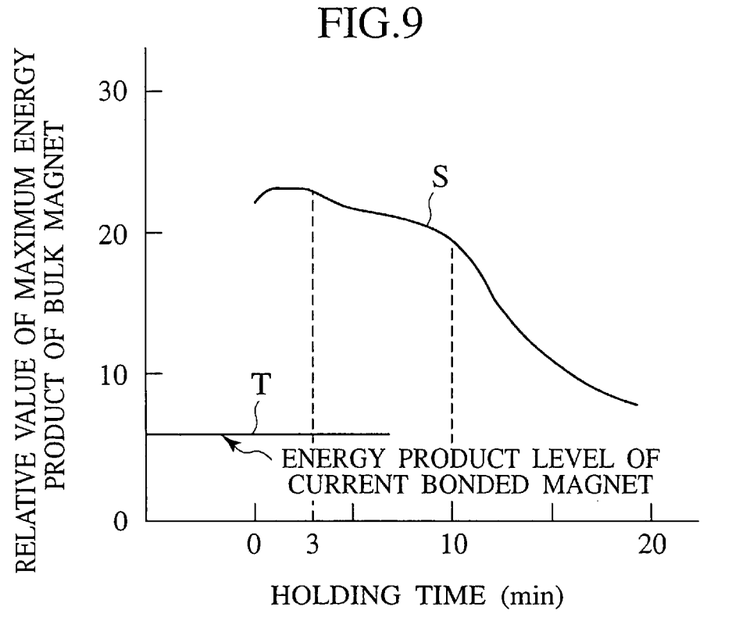
FIG. 9 is a graph illustrating the magnet properties of a bulk magnet with $Nd_8Dy_1Fe_{75}Co_4V_2B_7$ composition in terms of a variation of a holding time period during a sintering step.

FIG. 9 is a graph illustrating a curve of the magnet properties (maximum energy product) of a bulk magnet fabricated with a $Nd_8Dy_1Fe_{75}Co_4V_2B_7$ composition, plotted in terms of the holding time period, with the bulk magnet was prepared under the following fabricating condition:

Composition: $Nd_8Dy_1Fe_{75}Co_4V_2B_7$

Fabricating condition of magnet powders: rapid liquid quenching process with a peripheral speed of a roll=20 m/sec Sintering condition: compacting pressure=300 MPa, temperature rising speed of 10° C./min, a holding temperature of 700° C., and a surrounding pressure at $2.6\times10^{-4}$ Pa.

As seen from FIG. 9, with a case where the holding time period remains in a range from 0 to 10 min, it is recognized that the magnet properties are improved and more preferably for the holding time period of from 0 to 3 min, further improved magnet properties are obtained.

EXAMPLE 9

Figure 10:
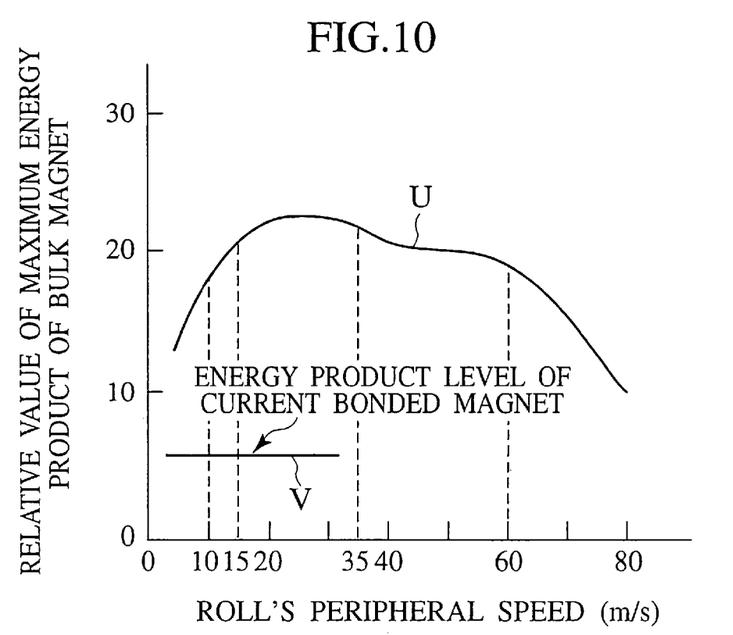
FIG. 10 is a graph illustrating the magnet properties of a bulk magnet with $Nd_8Tb_2Fe_{75}Co_5Nb_2B_8$ composition in terms of a variation in a peripheral speed of a roll.

FIG. 10 is a graph illustrating a curve of the magnet properties (maximum energy product) of a bulk magnet fabricated with a $Nd_8Tb_2Fe_{75}Co_5Nb_2B_8$ composition, plotted in terms of the peripheral speed of the roll, with the bulk magnet was prepared under the following fabricating condition:

Composition: $Nd_8Tb_2Fe_{75}Co_5Nb_2B_8$

Fabricating condition of magnet powders: rapid liquid quenching process

Sintering condition: compacting pressure=1000 MPa, temperature rising speed of 25° C./min, a holding time period of 2 min, a holding temperature of 680° C., and a surrounding pressure at $2.6 \times 10^{-4}$ Pa.

As seen from FIG. 10, with a case where the peripheral speed of the roll remains in a range from 10 to 60 m/sec, it is recognized that the magnet properties are improved and more preferably at the peripheral speed of 15 to 35 m/sec, further improved magnet properties are obtained.

EXAMPLE 10

Figure 11:
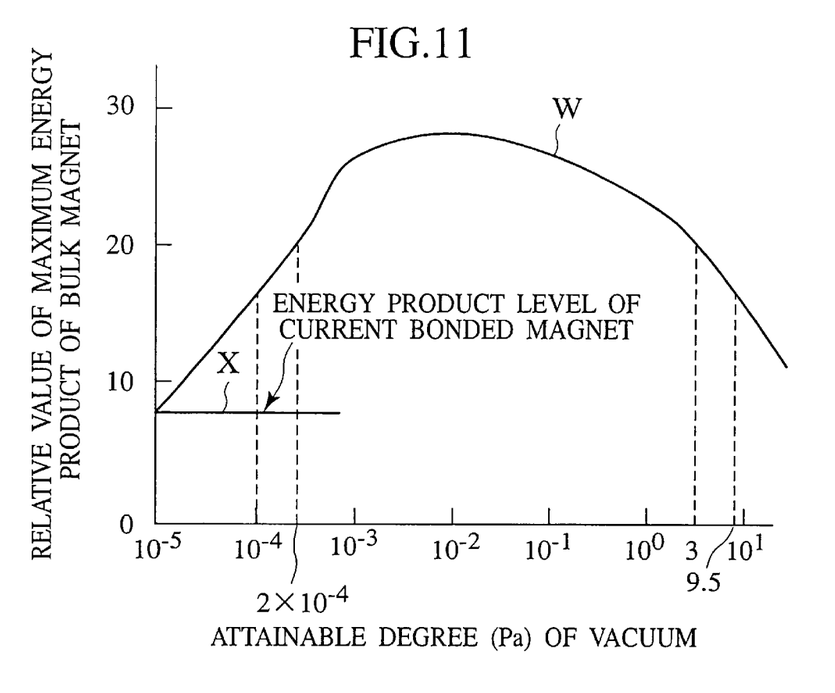
FIG. 11 is a graph illustrating the magnet properties of a bulk magnet with $Nd_{10}Fe_{75}Co_8V_1B_6$ composition in terms of a variation in an environment pressure during a sintering step.

FIG. 11 is a graph illustrating a curve of the magnet properties (maximum energy product) of a bulk magnet fabricated with a $Nd_{10}Fe_{75}Co_8V_1B_6$ composition, plotted in terms of the surrounding pressure during the sintering step, with the bulk magnet was prepared under the following fabricating condition:

Composition: $Nd_{10}Fe_{75}Co_8V_1B_6$

Fabricating condition of magnet powders: rapid liquid quenching process at the peripheral speed of the roll of 20 m/sec Sintering condition: compacting pressure=1000 MPa, temperature rising speed of 20° C./min, a holding time period of 0 min and a holding temperature of 650° C.

As seen from FIG. 11, with a case where the surrounding pressure remains in a range from $1 \times 10^{-4}$ to 9.5 Pa, it is recognized that the magnet properties are improved and more preferably under the surrounding pressure of from $2 \times 10^{-4}$ to 3 Pa, further improved magnet properties are obtained.

EXAMPLE 11

Figure 12:
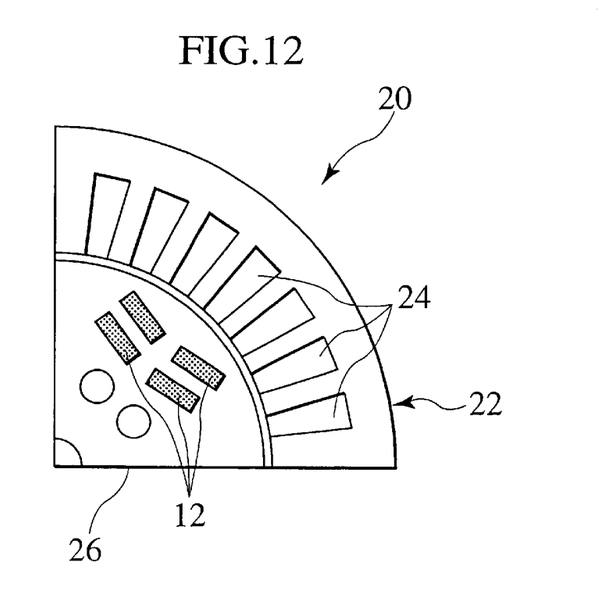
FIG. 12 is a schematic side view of an example of a drive motor, for use in an electric vehicle or a hybrid electric vehicle, to which a bulk magnet of the present invention is applied.

FIG. 12 shows an example of the device composed of a drive motor 20, which incorporates the bulk motor 12 of the present invention, for use in an electric vehicle or a hybrid electric vehicle. More particularly, the drive motor 20 includes a stator 22 formed with stator windings 24, and a rotor 26. The rotor 26 includes a plurality of the bulk magnets 12 which have been discussed above. Comparison tests between the drive motor of the present invention and the related art drive motor employing the commercially available bonded magnets have revealed that the drive motor of the present invention had the maximum torque of 1.4 times greater than that of the related art drive motor.

The entire content of a Japanese Application No. P2000-291692 with a filing date of Sep. 26, 2000 is herein incorporated by reference.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A bulk exchange-spring magnet comprising:
   a densified magnet powders including a hard phase and a soft phase; and
   boron atoms and oxygen atoms;
   wherein the boron atoms and the oxygen atoms cohere in boundary areas between grains of the densified magnet powders, and
   wherein the magnet powders are composed of a composition expressed by $Nd_xFe_{100-x-y}B_y$, wherein x=4~11 and y=3~8.

2. A bulk exchange-spring magnet comprising:
   a densified magnet powders including a hard phase and a soft phase; and
   boron atoms and oxygen atoms;
   wherein the boron atoms and the oxygen atoms cohere in boundary areas between grains of the densified magnet powders, and
   wherein the magnet powders are composed of a composition expressed by $Nd_xFe_{100-x-y}B_y$, wherein x=7.5~10.5 and y=5.5~7.5.

3. A bulk exchange-spring magnet comprising:
   a densified magnet powders including a hard phase and a soft phase; and
   boron atoms and oxygen atoms;
   wherein the boron atoms and the oxygen atoms cohere in boundary areas between grains of the densified magnet powders, and
   wherein the ratio between the concentration of the boron atoms lying in the boundary areas between the grains of the densified magnet powders and that of the boron atoms lying inside the grains of the densified magnet powders is selected to be greater than 1.2; and
   wherein the ratio between the concentration of the oxygen atoms lying in the boundary areas between the grains of the densified magnet powders and that of the oxygen atoms lying inside the grains of the densified magnet powders is selected to be greater than 1.2; and
   wherein the magnet powders are composed of a composition expressed by $Nd_xFe_{100-x-y}B_y$, wherein x=4~11 and y=3~8.

4. A bulk exchange-spring magnet comprising:
   a densified magnet powders including a hard phase and a soft phase; and
   boron atoms and oxygen atoms;
   wherein the boron atoms and the oxygen atoms cohere in boundary areas between grains of the densified magnet powders, and
   wherein each of boundary areas of the densified magnet powders has a thickness greater than 65 nm.

5. A bulk exchange-spring magnet comprising:
   a densified magnet powders including a hard phase and a soft phase; and
   boron atoms and oxygen atoms;
   wherein the boron atoms and the oxygen atoms cohere in boundary areas between grains of the densified magnet powders, and
   wherein the magnet powders have a grain size ranging from 20 to 500 µm, and wherein the magnet powders are composed of a composition expressed by $Nd_xFe_{100-x-y}B_y$, wherein $x=4\sim11$ and $y=3\sim8$.

6. A bulk exchange-spring magnet comprising:

a densified magnet powders including a hard phase and a soft phase; and boron atoms and oxygen atoms;

wherein the boron atoms and the oxygen atoms cohere in boundary areas between grains of the densified magnet powders, and wherein the magnet powders have a grain size ranging from 80 to 200 $\mu$m.

* * * * *